United States Patent
Touchberry (10) Patent No.: US 10,240,928 B2
(45) Date of Patent: Mar. 26, 2019

(54) SYSTEMS AND METHODS FOR PREDICTIVE HEALTH MONITORING OF GYROSCOPES AND ACCELEROMETERS

(71) Applicant: Honeywell International Inc., Morristown, NJ (US)

(72) Inventor: Alan Bruce Touchberry, St. Louis Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 500 days.

(21) Appl. No.: 14/467,149

(22) Filed: Aug. 25, 2014

(65) Prior Publication Data

US 2016/0054128 A1 Feb. 25, 2016

(51) Int. Cl.
*G01C 21/10* (2006.01)
*G01C 25/00* (2006.01)

(52) U.S. Cl.
CPC ........... *G01C 21/10* (2013.01); *G01C 25/005* (2013.01)

(58) Field of Classification Search
CPC .. G01M 99/008; G01M 13/045; G01M 15/12; G01R 19/2513
See application file for complete search history.

(56) References Cited

U.S. PATENT DOCUMENTS

| | | | |
|---|---|---|---|
| 5,684,718 A | 11/1997 | Jenkins et al. | |
| 6,298,316 B1 * | 10/2001 | Diesel | 702/190 |
| 6,445,983 B1 * | 9/2002 | Dickson et al. | 701/23 |
| 7,069,185 B1 | 6/2006 | Wilson et al. | |
| 7,539,597 B2 | 5/2009 | Wegerich et al. | |
| 7,591,183 B2 | 9/2009 | King | |
| 8,436,723 B2 | 5/2013 | Siavoshani et al. | |
| 2003/0130791 A1 * | 7/2003 | McIntyre | 701/213 |
| 2004/0194532 A1 | 10/2004 | Lally et al. | |
| 2007/0059986 A1 * | 3/2007 | Rockwell | 439/638 |
| 2007/0143064 A1 | 6/2007 | Boran et al. | |
| 2011/0258044 A1 * | 10/2011 | Kargupta | 705/14.49 |
| 2012/0022762 A1 * | 1/2012 | Rosero | 701/101 |
| 2014/0025286 A1 * | 1/2014 | Donovan | G01C 21/20 701/408 |

FOREIGN PATENT DOCUMENTS

DE 102007037298 2/2009

OTHER PUBLICATIONS

European Patent Office, "Extended European Search Report from EP Application No. 15180836.7 dated Jan. 19, 2016", "from Foreign Counterpart of U.S. Appl. No. 14/467,149", dated Jan. 19, 2016, pp. 1-7, Published in: EP.

* cited by examiner

*Primary Examiner* — Hussein Elchanti
*Assistant Examiner* — Paul A Castro
(74) *Attorney, Agent, or Firm* — Fogg & Powers LLC (57) ABSTRACT

Systems and methods for predictive health monitoring of gyroscopes and accelerometers are provided. In one embodiment, a system comprises: a plurality of navigation devices each comprising at least one gyroscope or accelerometer and at least one predictive health monitoring module, wherein the at least one predictive health monitoring module collects diagnostic parameters from the at least one gyroscope or accelerometer; and at least one server communicatively coupled to the plurality of navigation devices, the at least one server configured to receive the collected data from the plurality of navigation devices and analyze the collected data from the plurality of navigation devices to determine a service prognosis.

17 Claims, 3 Drawing Sheets

SYSTEMS AND METHODS FOR PREDICTIVE HEALTH MONITORING OF GYROSCOPES AND ACCELEROMETERS

BACKGROUND

Inertial navigation devices used on aircrafts include gyroscopes and accelerometers. After a certain amount of use, the gyroscopes and accelerometers will reach their end of life. When a gyroscope or accelerometer reaches its end of life and fails to function as designed, the navigation device that includes the gyroscope or accelerometer will need to be repaired or replaced. Unscheduled maintenance of a navigation device can lead to additional downtime for the aircraft, which can result in lost revenue for the aircraft's operator.

For the reasons stated above and for reasons stated below which will become apparent to those skilled in the art upon reading and understanding the specification, there is a need in the art for improved systems and methods for reducing unscheduled maintenance sessions of aircrafts due to faulty gyroscopes and accelerometers in navigation devices.

SUMMARY

The Embodiments of the present invention provide systems and methods for predictive health monitoring of gyroscopes and accelerometers.

In one embodiment, a system comprises: a plurality of navigation devices each comprising at least one gyroscope or accelerometer and at least one predictive health monitoring module, wherein the at least one predictive health monitoring module collects diagnostic parameters from the at least one gyroscope or accelerometer; and at least one server communicatively coupled to the plurality of navigation devices, the at least one server configured to receive the collected data from the plurality of navigation devices and analyze the collected data from the plurality of navigation devices to determine a service prognosis.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments disclosed herein reduce the unplanned downtime for an aircraft due to repairing a navigation device because of one or more faulty gyroscopes and/or accelerometers. The embodiments herein accomplish this by collecting data on the gyroscopes and accelerometers and sending the collected data to one or more servers. The servers then analyze the collected data to determine a service prognosis for the gyroscopes and accelerometers. Moreover, in some embodiments, the service prognosis for the gyroscopes and accelerometers can include a prediction for the expected remaining useful life for each of the gyroscopes and accelerometers. When the service prognosis for a gyroscope or accelerometer indicates that it is coming to the end of its useful life, it can be replaced during a scheduled maintenance session of the aircraft before the gyroscope or accelerometer actually fails. As a result, unscheduled maintenance sessions for the aircraft are reduced.

Figure 1:
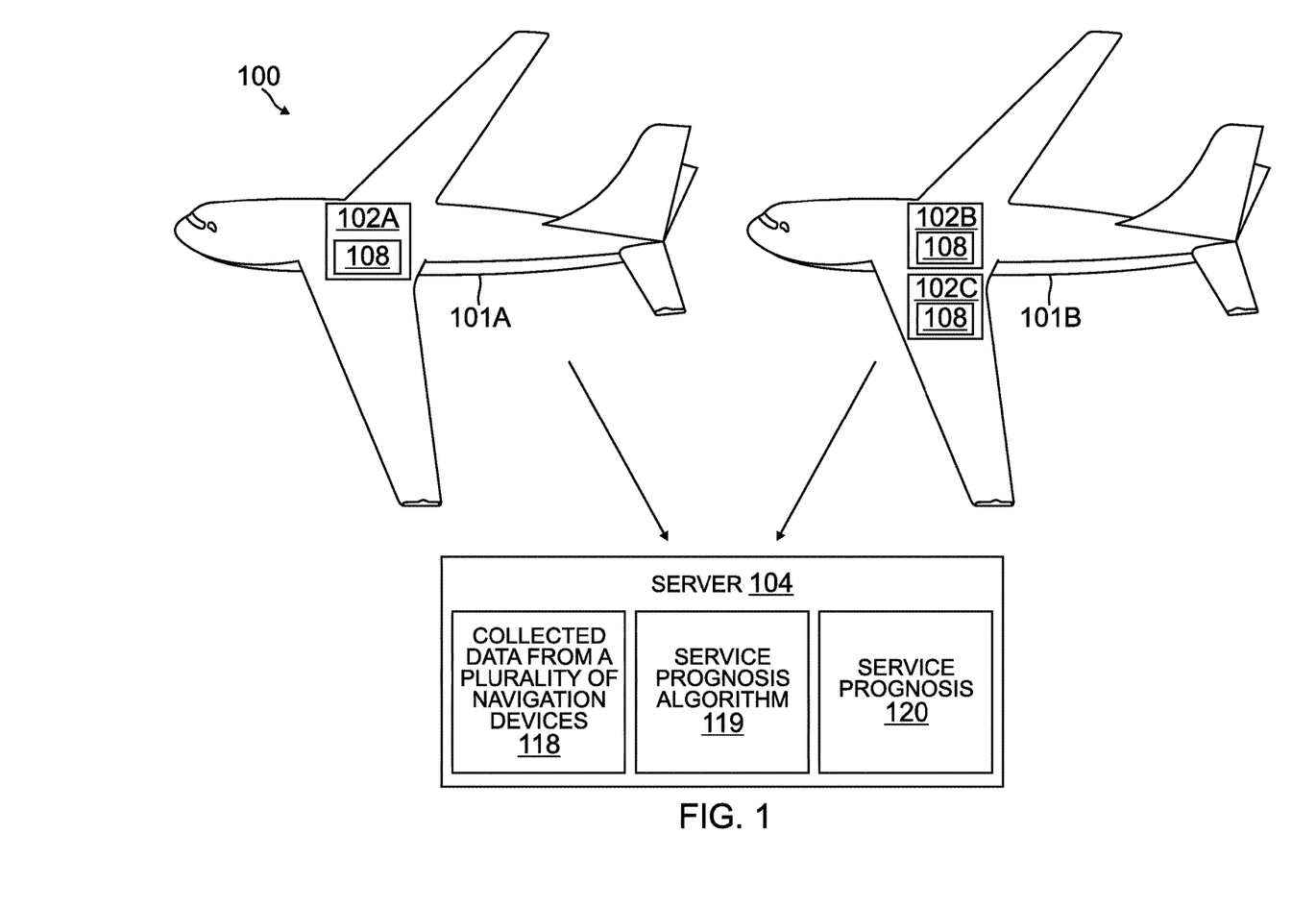
FIG. 1 is a diagram of an example system for predictive health monitoring of gyroscopes and accelerometers.

FIG. 1 is a diagram of an example system 100 of one embodiment of the present disclosure. The system 100 includes a plurality of navigation devices 102A-102C, each of which include a predictive health monitoring module 108. Generally, a navigation device 102A-102C is used by an aircraft 101A, 101B to determine the position and attitude of the aircraft 101A, 101B. Included in the navigation devices 102A-102C are monitors, gyroscopes and/or accelerometers. The gyroscopes determine rotational motion of an aircraft and the accelerometers determine linear motion of an aircraft. The monitors collect data on the gyroscopes and accelerometers, as explained in more detail in FIG. 2 below. The collected data is then transmitted to one or more servers 104. The server(s) 104 store the collected data from a plurality of gyroscopes and accelerometers, analyze the collected data and predict various health parameters for the gyroscopes and accelerometers. The data collection methods and the prediction methods are described in more detail in FIG. 2.

As shown in FIG. 1, in exemplary embodiments, one or more navigation devices 102A-102C are installed on board aircrafts 101A, 101B. However, in some embodiments the navigation devices 102A-102C can be installed on other types of vehicles, as well. In some embodiments, the navigation devices 102A-102C can be components within a larger systems, e.g., an avionics computer. In other embodiments, the navigation devices 102A-102C can be a stand-alone system. FIG. 1 shows that the aircrafts 101A, 101B include one or two navigations devices on each of the aircrafts 101A, 101B; however, this is only an example and any number of navigation devices 102A-102C can be included on each aircraft 101A, 101B. In exemplary embodiments, there are redundant navigation devices 102A-102C on each aircraft 101A, 101B in case one or more of the navigation devices fails 102A-102C to operate correctly.

As stated above, the data collected by the navigation devices 102A-102C is transmitted to one or more servers 104, where the server collects the data 118 and processes the data using an algorithm 119 to determine a service prognosis 120 of the gyroscopes and accelerometers. In some embodiments, the data can be transmitted at different intervals such as, e.g., after every flight or once a day or once a week. In other embodiments, the data can be transmitted as soon as the data is collected. In some embodiments, the data from the navigation devices 102A-102C can be transmitted to the server(s) 104 while the aircraft 101A, 101B is located at an airport. For example, the data can be transferred while the aircraft is connected to an aircraft maintenance bus in the aircraft's terminal. The data could also be transferred via a local wireless connection to a handheld receiver. However, these are only examples and not meant to be limiting. In some embodiments, the data from the navigation devices 102A-102C can be transmitted to the server(s) 104 while the aircraft 101A, 101B is in the air. In these embodiments, the data can be transferred using a high frequency (HF), very high frequency (VHF), or Satellite Communication (SAT-COM) system, wherein the SATCOM system can include protocols conforming to the following systems: Inmarsat, Iridium, Thuraya, MTSAT, Iris, AeroMACS and Iridium NEXT. However, similar to above, these are only examples and not meant to be limiting.

Figure 2:
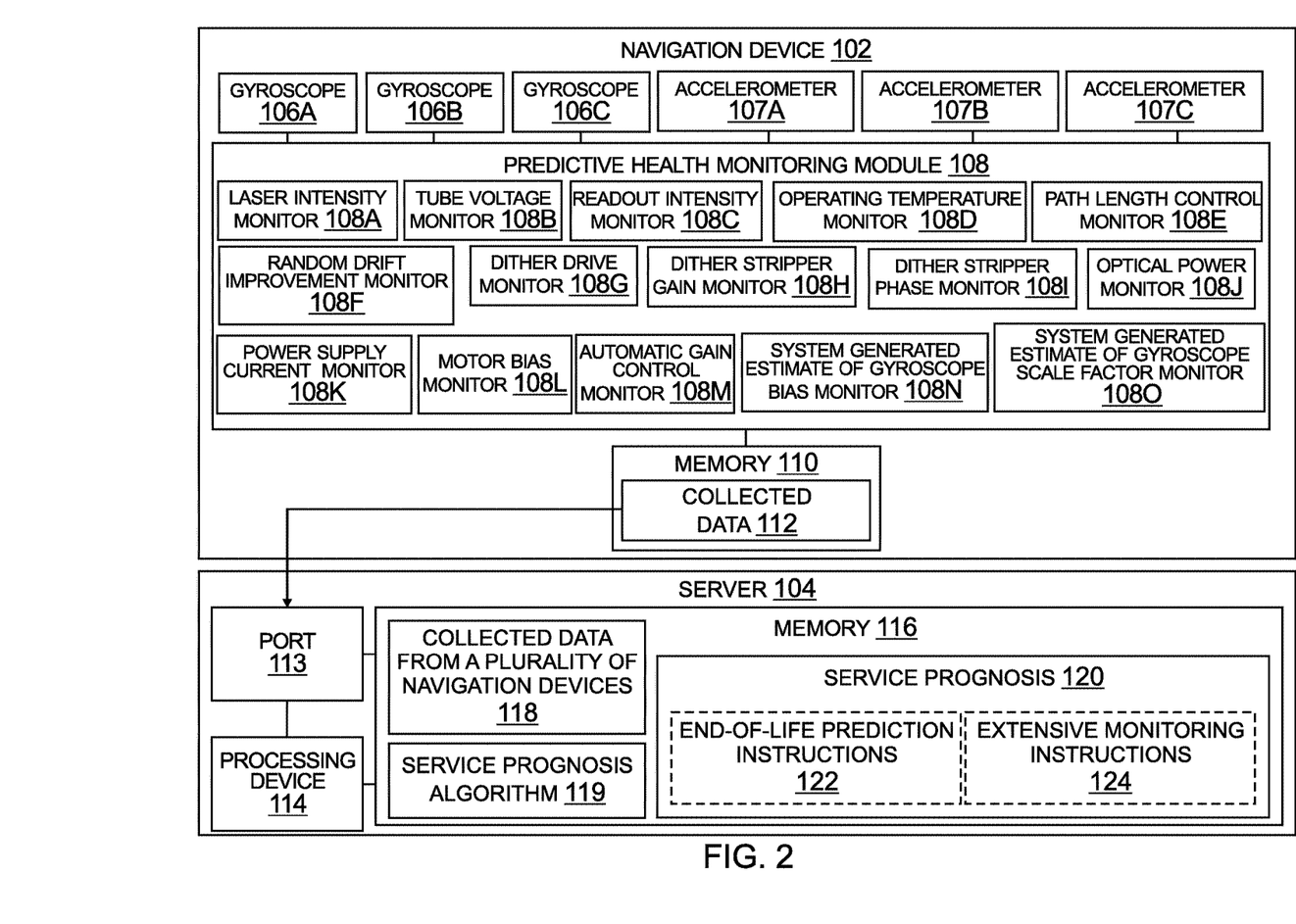
FIG. 2 is a block diagram of an example navigation device and server that can be used in FIG. 1.

FIG. 2 is a block diagram of an example navigation device 102 and server 104 that can be used in FIG. 1. The navigation device 102 includes, in part, a plurality of gyroscopes 106A-106C and/or accelerometers 107A-107C, one or more predictive health monitoring modules 108 to collect a plurality of diagnostic parameters of the gyroscopes 106A-106C and accelerometers 107A-107C, and memory 110 for storing the plurality of measurements of the gyroscopes 106A-106C and accelerometers 107A-107C measured by the monitors 110, also referred to herein as collected data 112.

As stated above, the gyroscopes 106A-106C included in the navigation device 102 measure rotational motion of the aircraft 101A, 101B and the accelerometers measure linear motion of the aircraft 101A, 101B on which the navigation device 102 is installed. In exemplary embodiments, three gyroscopes 106A-106C and three accelerometers 107A-107C are installed on each navigation device 102. However, while three gyroscopes 106A-106C and three accelerometers 107A-107C are included in the navigation device 102 in FIG. 2, more or less gyroscopes 106A-106C and accelerometers 107A-107C can be included in a navigation device 102. In some embodiments, only one or more gyroscopes 106A-106C are included in a navigation device 102. In some embodiments, only one or more accelerometers 107A-107C are included in a navigation device 102. In some embodiments, one or more gyroscopes 106A-106C and one or more accelerometers 107A-107C are included in a navigation device 102. Moreover, the types of gyroscopes 106A-106C and accelerometers 107A-107C included in the navigation device 102 can vary. Examples of gyroscopes include, but are not limited to, ring laser gyroscopes (RLGs), micro-electromechanical system (MEMS) gyroscopes, fiber optic gyroscopes (FOGs), etc.

Further, as stated above the predictive health monitoring module 108 observes and track a plurality of diagnostic parameters for each of the gyroscopes 106A-106C and accelerometers 107A-107C. The predictive health monitoring module 108 can include a plurality of monitors 108A-108O. The monitors can include, but are not limited to, the following: a laser intensity monitor 108A, a tube voltage monitor 108B, a readout intensity monitor 108C, an operating temperature monitor 108D, a path-length control monitor 108E, a random drift improvement monitor 108F, a dither drive monitor 108G, a dither stripper gain monitor 108H, a dither stripper phase monitor 108I, an optical power monitor 108J, a power supply current monitor 108K, a motor bias monitor 108L, and an automatic gain control (AGC) monitor 108M. Moreover, in some embodiments, system derived monitors may also be used to track gyroscope performance shifts. For example, a system generated estimate of the gyro bias developed from a truth reference and a filter, such as a Kalman filter, may be used as a monitor 108N. Moreover, a system generated estimate of the gyro scale factor developed from a truth reference and a filter may be used as a monitor 108O.

The types of monitors 108A-108O included in the navigation device 102 will depend on the type of gyroscope 106A-106C and/or accelerometer 107A-107C included in the navigation device. For example, for RLGs, the navigation device 102 may include the following monitors: the following: a laser intensity monitor 108A, a tube voltage monitor 108B, a readout intensity monitor 108C, an operating temperature monitor 108D, a path-length control monitor 108E, a random drift improvement monitor 108F, a dither drive monitor 108G, a dither stripper gain monitor 108H and a dither stripper phase monitors 108I. For MEMS gyroscopes, the navigation device 102 may include the following monitors: an operating temperature monitor 108D, a motor bias monitor 108L, and an automatic gain control monitor 108M. For FOGs, the navigation device 102 may include an operating temperature monitor 108D, an optical power monitor 108J, and a power supply current monitor 108K. However, these are only examples and not meant to be limiting.

Each of these monitors 108A-108O takes measurements of the diagnostic parameter the monitor is designed to track. For example, the laser intensity monitor 108A measures the laser intensity of a gyroscope 106A-106C, the tube voltage monitor 108B measure the tube voltage of a gyroscope 106A-106C, etc. In some embodiments, the monitors 108A-108O take measurements at a specified interval, e.g., every 250 hours or every 500 hours. In other embodiments, the monitors 108A-108O take measurements continuously. In even other embodiments, a subset of the monitors 108A-108O takes measurements at a specified interval while a different subset of the monitors 108A-108O takes measurements continuously.

Each diagnostic parameter from a gyroscope 106A-106C and/or accelerometer 107A-107C that is collected by the predictive health monitoring module 108 is correlated to the specific gyroscope 106A-106C and accelerometer 107A-107C. Included in this data can be if a gyroscope 106A-106C or accelerometer 107A-107C has stopped working properly and any measurements taken by the predictive health monitoring module 108 up to and including when the gyroscope(s) 106A-106C and/or accelerometer 107A-107C stopped working. Collecting this data aids in determining the end of life for a specific gyroscope 106A-106C or accelerometer 107A-107C, as explained in more detail below.

In exemplary embodiments, once the data 112 is collected by the predictive health monitoring module 108, the data 112 is then stored in the navigation device's 102 memory 110 until the data 112 is transferred to the server(s) 104. In some embodiments, however, the data 112 can be transferred to a memory device not included in the navigation device 102 for storage. In some embodiments, this memory device can be located on the aircraft; and in other embodiments, this memory device can be located off of the aircraft.

In some embodiments, instead of storing raw data, a statistical compilation of the collected data 112 can be computed and stored in the memory 110 in order to save space on the memory 110 and/or reduce the amount of data that needs to be transferred to and analyzed by the server(s) 104. For example, the statistical compilation stored in memory 110 may include whether a gyroscope 106A-106C had a diagnostic parameter measured by one of the monitors 108A-108O fall below a certain threshold. In some embodiments, the statistical compilation may include whether a gyroscope 106A-106C had a diagnostic parameter measured by one of the monitors 108A-108O change by a certain percentage from its initial value. In some embodiments, the statistical compilation may include whether a gyroscope 106A-106C had the change of a diagnostic parameter measured by one of the monitors 108A-108O accelerate. That is, stated another way, whether a diagnostic parameter is changing by a rate greater than a certain threshold. Moreover, a combination of some or all of these measurements may be used in the statistical compilation. However, this list is not exhaustive and not meant to be limiting. In some embodiments, if the data 112 and/or statistical compilation is transferred after every flight and an average is used, the amount of data 112 transferred per flight could be less than a few thousand bytes of information.

After the data 112 from the predictive health monitoring module 108 is transmitted to a server(s) 104, the server(s) 104 analyzes the data. As stated above, the server 104 can include one or more servers 104. In some embodiments, if there is more than one server 104, the servers 104 can be located at a central location. In other embodiments, the servers 104 can be located at different locations, but can be communicatively coupled in order to analyze the data sent by the navigation devices 102A-102C.

An example server 104 is shown in FIG. 2 and includes a port 113 configured to receive the collected data 112 from the navigation device 102, a processing device 114 and memory 116 for storing the collected data from a plurality of navigation devices 118 and service prognosis 120. However, a server 104 can include any software, hardware, firmware, or combination thereof configured to process the data 112 collected by the predictive health monitoring module 108.

The collected data from a plurality of navigation devices 118 includes the collected data 112 transferred from a plurality of navigation devices 102 located on a plurality of aircrafts 101A, 101B to the server 104. Moreover, in some embodiments, the collected data from a plurality of navigation devices 118 can also include data collected on gyroscopes 106A-106C and/or accelerometers 107A-107C tested in a laboratory or installed on vehicles other than aircrafts 101A, 101B.

The processing device 114 uses the collected data from a plurality of navigation devices 118 and analyzes the data 118 using a service prognosis algorithm 119 for determining a service prognosis for each specific gyroscope and accelerometer which is then stored in memory 116 as shown at 120. In some embodiments, the service prognosis algorithm 119 instructs the processing device 114 to analyze the data 118 and determine the service prognosis 120 for gyroscopes 106A-106C and accelerometers 107A-107C by correlating collected data 118 measured from failed gyroscopes 106A-106C or accelerometers 107A-107C with collected data 118 measured from healthy gyroscopes 106A-106C and accelerometers 107A-107C. That is, in some embodiments, if a gyroscope 106A-106C or accelerometer 107A-107C stops working, the service prognosis algorithm 119 will instruct the processing device 114 to record the parameters measured by the predictive health monitoring module 108 of the gyroscope 106A-106C or accelerometer 107A-107C and use some or all of those parameters in the service prognosis 120 of healthy gyroscopes 106A-106C and accelerometers 107A-107C. For example, if a gyroscope 106A-106C fails and the tube voltage parameter of the failed gyroscope 106A-106C was 80% the tube voltage parameter of a new gyroscope 106A-106C, and the tube voltage dropped below 80% 5,000 hours before the gyroscope 106A-106C failed, the service prognosis algorithm 119 can instruct the processing device 114 to update the service prognosis 120 to include a likelihood of failure of a gyroscope 106A-106C when the tube voltage drops below 80% the tube voltage of new gyroscope 106A-106C. In the future then, if any operational gyroscopes 106A-106C start to exhibit the parameters (e.g., a tube voltage that is 80% that of a new one) then the service prognosis 120 can include instructions for notifying maintenance personnel of the gyroscope's 106A-106C possible failure in the near future.

The service prognosis 120 of a gyroscope 106A-106C or accelerometer 107A-107C can include, but are not limited to, whether all the parts of the gyroscope 106A-106C and accelerometers 107A-107C are functioning properly, whether component of a gyroscope 106A-106C or accelerometer 107A-107C has degraded, the useful life remaining on a part of the gyroscope 106A-106C or accelerometer 107A-107C, or the useful life remaining on the gyroscope 106A-106 or accelerometer 107A-107C as a whole (also referred to herein as the end of life of the gyroscope or accelerometer). So, for example, if the processing device 114 correlates a gyroscope 106A-106C or accelerometer 107A-107C will fail when a certain part of the gyroscope 106A-106C or accelerometer 107A-107C degrades to a certain level, then that correlation can be included in the service prognosis 120. When the collected data from a plurality of navigation devices 118 is updated with additional collected data 112, the processing device 114 can further refine the service prognosis 120 using the algorithm to determine the service prognosis 119.

In some embodiments, the service prognosis 120 can include a set of initial conditions, which is an estimation of the health parameters of a gyroscope 106A-106C and accelerometers 107A-107C. Examples of initial conditions can include, but are not limited to, the following: a gyroscope 106A-106C or accelerometer 107A-107C will reach its end of life after 100,000 hours of use, or a gyroscope 106A-106C will reach its end of life when the laser intensity of the gyroscope 106A-106C goes below a certain threshold, or a gyroscope 106A-106C will reach its end of life within 5,000 hours of the gyroscope's 106A-106C laser intensity going below a certain threshold and the gyroscope's tube voltage monitor changes by a certain percentage, or a combination thereof. However, these are only examples and not meant to be limiting. In some embodiments, the initial conditions used in the service prognosis 120 can be set without any prior knowledge. In other embodiments, the initial conditions in the service prognosis 120 can be set using prior data obtained in a laboratory or in the field.

Once the initial conditions are set, the collected data from a plurality of navigation devices 118 is used to refine the service prognosis 120. For example, assume that the initial conditions were set to predict the end of life of a gyroscope 106A-106C or accelerometer 107A-107C when the operating temperature of the gyroscope 106A-106C or accelerometer 107A-107C was above a certain threshold for over 10,000 hours. However, the collected data from a plurality of navigation devices 118 included gyroscopes 106A-106C and accelerometers 107A-107C failing when the gyroscopes 106A-106C and accelerometers 107A-107C were operating above the temperature threshold for only 9,000 hours. As a result, the service prognosis 120 are modified to include this new condition. As stated above, this is only an example and not meant to be limiting. The conditions that the service prognosis 120 includes to predict the end of life of a gyroscope 106A-106C or accelerometer 107A-107C can include any predictions based on the collected data from a plurality of navigation devices 118 and any additional conditions programmed by the operator of the server 104.

As stated above, in some embodiments, the service prognosis 120 can include end-of-life prediction instructions 122. That is, the end-of-life prediction instructions 122 predict when an active gyroscope 106A-106C or accelerometer 107A-107C is about to fail. These prediction instructions 122 can be based on the collected data from a plurality of navigation devices 118 and the service prognosis 120. More specifically, as an example, a gyroscope 106A-106C with serial number XYZ is installed in a navigation device 102 located on an aircraft 101A. The end-of-life prediction instructions 122 are then configured to indicate that the gyroscope 106A-106C with serial number XYZ will reach its end of life within a certain amount of hours by correlating the service prognosis 120 to the measured data of the gyroscope 106A-106C by the predictive health monitoring module 108. Once a gyroscope 106A-106C is predicted to fail within a certain amount of hours, e.g., 5,000 hours, that information can be communicated to an appropriate maintenance system. After which, the gyroscope 106A-106C can be scheduled to be replaced during the next scheduled maintenance session of the aircraft 101A, 101B. As a result, an unscheduled maintenance session to replace the gyroscope 106A-106C after it fails is avoided.

Moreover, in some embodiments, the service prognosis 120 can include extensive monitoring instructions 124, as well. For example, if a gyroscope 106A-106C or accelerometer 107A-107C is exhibiting unusual behavior that has not been collected before by the monitors 108A-108O, the service prognosis 120 can include extensive monitoring instructions 124, which can communicate that a gyroscope 106A-106C is exhibiting unusual behavior to an appropriate maintenance system and the gyroscope 106A-106C or accelerometer 107A-107C can be inspected during the next scheduled maintenance of the aircraft 101A, 101B and/or flagged for more extensive monitoring 108A-108O by the navigation device 102. This may include transmitting data continuously to the server 104, if it is not already and/or collecting data continuously, as opposed to an average. These are only examples, however, and not meant to be limiting.

Figure 3:
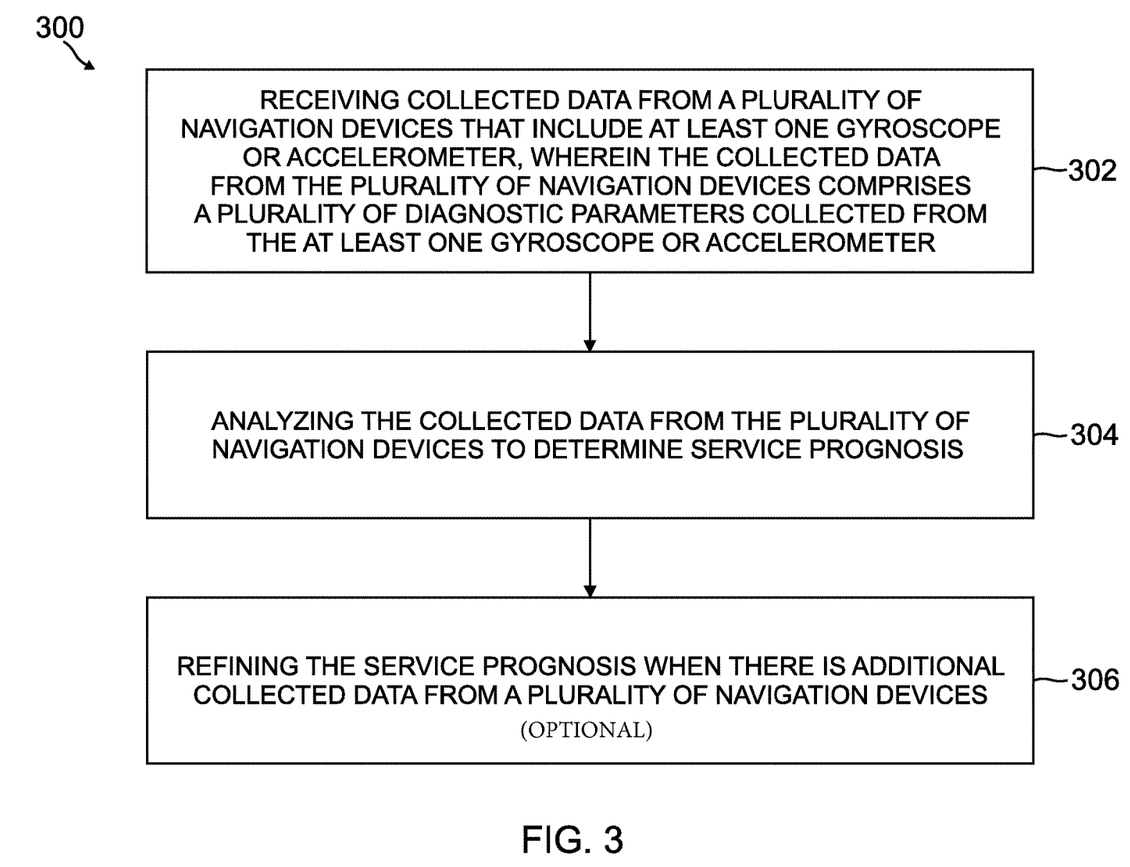
FIG. 3 is a flow diagram of an example method for predictive health monitoring of gyroscopes and accelerometers.

FIG. 3 is a flow diagram of an example method 300 for predictive health monitoring of gyroscopes and accelerometers. In some embodiments, method 300 comprises receiving collected data from a plurality of navigation devices that include at least one gyroscope or accelerometer, wherein the collected data from the plurality of navigation devices comprises a plurality of diagnostic parameters collected from the at least one gyroscope or accelerometer (block 302). The navigation device, the gyroscope, the accelerometer, and the collected data received from a plurality of navigation devices can have some or all of the same characteristics as the navigation device 102, the gyroscopes 106A-106C, the accelerometers 107A-107C, and the collected data 112 discussed above, respectively, in FIG. 1. For example, the collected data can be measurements taken by a predictive health monitoring module that includes a plurality of monitors from at least one gyroscope or accelerometer. Furthermore, the monitors can include any of the monitors 108A-108O discussed above including, but not limited to, the following: laser intensity monitor, tube voltage monitor, readout intensity monitor, operating temperature monitor, path length control monitor, random drift improvement monitor, dither drive monitor, a dither stripper gain monitor, a dither stripper phase monitor, an optical power monitor, a power supply current monitor, a motor bias monitor, an automatic gain control (AGC) monitor, a system generated estimate of gyroscope bias monitor, and a system generated estimate of gyroscope scale factor monitor. Moreover, in some embodiments the collected data can be received in the ways discussed above in FIGS. 1 and 2. Namely, the data can be received at certain intervals or continuously and using a SATCOM connection (or other connection such as VHF) or using an aircraft maintenance bus or a local wireless connection when on the ground.

Method 300 further comprises analyzing the collected data from the plurality of navigation devices to determine a service prognosis (block 304). Analyzing the collected data can include the methods discussed above in FIGS. 1 and 2. For example, analyzing the collected data can include looking for correlations in the collected data to determine the health of the gyroscope or accelerometer. Moreover, the service prognosis can include predicting the end of life for a gyroscopes or accelerometer that is included in the at least one gyroscopes or accelerometer. Also, similar to above, the service prognosis can include one or more initial conditions. Examples of initial conditions were given in the discussed above in FIGS. 1 and 2.

Finally, in some embodiments, method 300 can include refining the service prognosis when there is additional collected data received from a plurality of navigation devices (block 306). For example, if the service prognosis include instructions which predict that a gyroscope will come to its end of life within 5,000 hours when the tube voltage of the gyroscope goes below a certain threshold, but then additional collected is received indicating that the gyroscope will reach its end of life within 4,500 hours when the tube voltage of the gyroscope goes below the certain threshold, the service prognosis can be updated with this new information. However, this is only an example and not meant to be limiting.

The memory used in the present systems and methods can be any appropriate tangible and non-transitory processor readable medium used for storage of processor readable instructions or data structures. Suitable processor readable media can include tangible media such as magnetic or optical media. For example, tangible media can include physical devices such as, but not limited to a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc.

A processing device used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The processing device can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implemented particular abstract data types.

Instructions for carrying out the various process tasks, calculations, and generation of other data used in operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programming logic device.

EXAMPLE EMBODIMENTS

Example 1 includes a server comprising: a port configured to receive collected data from a plurality of navigation devices that includes at least one gyroscope or accelerometer, wherein the collected data from the plurality of navigation devices comprises a plurality of diagnostic parameters obtained from the at least one gyroscope or accelerometer; a memory, the memory configured to store the collected data from the plurality of navigation devices; and a processing device communicatively coupled to the memory, wherein the processing device is configured to analyze the collected data from the plurality of navigation devices to determine a service prognosis.

Example 2 includes the server of Example 1, wherein the service prognosis includes a prediction of an expected end of life for the at least one gyroscope or accelerometer.

Example 3 includes the server of any of Examples 1-2, wherein the service prognosis is further refined when the server receives additional collected data.

Example 4 includes the server of any of Examples 1-3, wherein the service prognosis are determined based on one or more initial conditions.

Example 5 includes the server of any of Examples 1-4, wherein the plurality of diagnostic parameters are taken by a plurality of monitors that include at least one of the following: laser intensity monitor, tube voltage monitor, readout intensity monitor, operating temperature monitor, path length control monitor, random drift improvement monitor, dither drive monitor, dither stripper gain monitor, dither stripper phase monitor, optical power monitor, power supply current monitor, motor bias monitor, automatic gain control monitor, system generated estimate of gyroscope bias monitor, and system generated estimate of gyroscope scale factor monitor.

Example 6 includes the server of any of Examples 1-5, wherein the plurality of diagnostic parameters include statistical compilations of raw data taken by a plurality of monitors.

Example 7 includes a method comprising: receiving collected data from a plurality of navigation devices that include at least one gyroscope or accelerometer, wherein the collected data from the plurality of navigation devices comprises a plurality of diagnostic parameters collected from the at least one gyroscope or accelerometer; and analyzing the collected data from the plurality of navigation devices to determine a service prognosis.

Example 8 includes the method of Example 7, wherein analyzing the collected data further comprises: predicting an end of life of the at least one gyroscope or accelerometer.

Example 9 includes the method of any of Examples 7-8, further comprising refining the service prognosis when there is additional collected data from a plurality of navigation devices.

Example 10 includes the method of any of Examples 7-9, wherein analyzing the collected data further comprises: determining the service prognosis based on one or more initial conditions associated with the at least one gyroscope or accelerometer.

Example 11 includes the method of any of Examples 7-10, wherein the plurality of diagnostic parameters are obtained by a plurality of monitors that include at least one of the following: laser intensity monitor, tube voltage monitor, readout intensity monitor, operating temperature monitor, path length control monitor, random drift improvement monitor, dither drive monitor, dither stripper gain monitor, dither stripper phase monitor, optical power monitor, power supply current monitor, motor bias monitor, automatic gain control monitor, system generated estimate of gyroscope bias monitor, and system generated estimate of gyroscope scale factor monitor.

Example 12 includes the method of any of Examples 7-11, wherein the plurality of diagnostic parameters include statistical compilations of raw data taken by a plurality of monitors.

Example 13 includes a system comprising: a plurality of navigation devices each comprising at least one gyroscope or accelerometer and at least one predictive health monitoring module, wherein the at least one predictive health monitoring module collects diagnostic parameters from the at least one gyroscope or accelerometer; and at least one server communicatively coupled to the plurality of navigation devices, the at least one server configured to receive the collected data from the plurality of navigation devices and analyze the collected data from the plurality of navigation devices to determine a service prognosis.

Example 14 includes the system of Example 13, wherein the service prognosis includes a prediction of an expected end of life for the at least one gyroscope or accelerometer.

Example 15 includes the system of any of Examples 13-14, wherein the server refines the service prognosis when the server receives additional collected data.

Example 16 includes the server of any of Examples 13-15, wherein the service prognosis are determined based on one or more initial conditions.

Example 17 includes the system of any of Examples 13-16, wherein the plurality of diagnostic parameters are taken by a plurality of monitors that include at least one of the following: laser intensity monitor, tube voltage monitor, readout intensity monitor, operating temperature monitor, path length control monitor, random drift improvement monitor, dither drive monitor, dither stripper gain monitor, dither stripper phase monitor, optical power monitor, power supply current monitor, motor bias monitor, automatic gain control monitor, system generated estimate of gyroscope bias monitor, and system generated estimate of gyroscope scale factor monitor.

Example 18 includes the system of any of Examples 13-17, wherein the plurality of diagnostic parameters include statistical compilations of raw data taken by a plurality of monitors.

Example 19 includes the system of any of Examples 13-18, wherein the server receives the collected data from the plurality of navigation devices continuously.

Example 20 includes the system of any of Examples 13-19, wherein the server receives the collected data from the plurality of navigation devices at specified intervals.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
a plurality of navigation devices; and
a server;
wherein the plurality of navigation devices each include at least one gyroscope or accelerometer, and each further includes at least one predictive health monitoring module that takes measurements of, and tracks, diagnostic parameters for the plurality of navigation devices and correlates the diagnostic parameters to the at least one gyroscope or accelerometer;
wherein the server includes:
a port that receives the diagnostic parameters from the predictive health monitoring module;
a memory that stores the diagnostic parameters; and
a processing device communicatively coupled to the memory, wherein the processing device analyzes the diagnostic parameters to
determine a service prognosis for the at least one gyroscope or accelerometer;
wherein the processing device determines the service prognosis by correlating collected data measured from at least one gyroscope or accelerometer that has since failed with collected data from at least one healthy gyroscope or accelerometer to provide an expected end of life prediction for the least one gyroscope or accelerometer of the plurality of navigation devices; and
wherein the processing device outputs a notification to a maintenance system, the notification including information in the service prognosis, to generate a maintenance action for the at least one gyroscope or accelerometer.

2. The system of claim 1, wherein the service prognosis is further refined when the server receives additional collected data.

3. The system of claim 1, wherein the service prognosis is determined based on one or more initial conditions.

4. The system of claim 1, wherein the plurality of diagnostic parameters are taken by a plurality of monitors that include at least one of the following: laser intensity monitor, tube voltage monitor, readout intensity monitor, operating temperature monitor, path length control monitor, random drift improvement monitor, dither drive monitor, dither stripper gain monitor, dither stripper phase monitor, optical power monitor, power supply current monitor, motor bias monitor, automatic gain control monitor, system generated estimate of gyroscope bias monitor, and system generated estimate of gyroscope scale factor monitor.

5. The system of claim 1, wherein the plurality of diagnostic parameters include statistical compilations of raw data taken by a plurality of monitors.

6. A method comprising:
using a predictive health monitor within a first navigation device that includes at least one gyroscope or accelerometer, collect a plurality of diagnostic parameters correlated to the at least one gyroscope or accelerometer;
receiving collected data from a plurality of navigation devices that includes the first navigation device, wherein the collected data comprises the plurality of diagnostic parameters correlated to the at least one gyroscope or accelerometer; and
analyzing the collected data from the plurality of navigation devices to determine a service prognosis for the at least one gyroscope or accelerometer;
wherein analyzing the collected data comprises correlating the collected data measured from at least one gyroscope or accelerometer that has since failed with collected data from at least one healthy gyroscope or accelerometer to provide an expected end of life prediction for the least one gyroscope or accelerometer; and
outputting a notification to a maintenance system, the notification including information in the service prognosis, to generate a maintenance action for the at least one gyroscope or accelerometer.

7. The method of claim 6, further comprising refining the service prognosis when there is additional collected data from a plurality of navigation devices.

8. The method of claim 6, wherein analyzing the collected data further comprises: determining the service prognosis based on one or more initial conditions associated with the at least one gyroscope or accelerometer.

9. The method of claim 6, wherein the plurality of diagnostic parameters are obtained by a plurality of monitors that include at least one of the following: laser intensity monitor, tube voltage monitor, readout intensity monitor, operating temperature monitor, path length control monitor, random drift improvement monitor, dither drive monitor, dither stripper gain monitor, dither stripper phase monitor, optical power monitor, power supply current monitor, motor bias monitor, automatic gain control monitor, system generated estimate of gyroscope bias monitor, and system generated estimate of gyroscope scale factor monitor.

10. The method of claim 6, wherein the plurality of diagnostic parameters include statistical compilations of raw data taken by a plurality of monitors.

11. A system comprising:
a plurality of navigation devices each comprising at least one gyroscope or accelerometer and wherein each of the plurality of navigation devices further comprises at least one predictive health monitoring module that monitors diagnostic parameters correlated to the at least one gyroscope or accelerometer; and
at least one server communicatively coupled to the plurality of navigation devices, the at least one server configured to receive collected data comprising the diagnostic parameters from the plurality of navigation devices and analyze the collected data from the plurality of navigation devices to determine a service prognosis for the at least one gyroscope or accelerometer;
wherein the at least one server determines the service prognosis by correlating collected data measured from at least one gyroscope or accelerometer that has since failed with collected data from at least one healthy gyroscope or accelerometer to provide an expected end of life prediction for the least one gyroscope or accelerometer.

12. The system of claim 11, wherein the server refines the service prognosis when the server receives additional collected data.

13. The server of claim 11, wherein the service prognosis is determined based on one or more initial conditions.

14. The system of claim 11, wherein the plurality of diagnostic parameters are taken by a plurality of monitors that include at least one of the following: laser intensity monitor, tube voltage monitor, readout intensity monitor, operating temperature monitor, path length control monitor, random drift improvement monitor, dither drive monitor, dither stripper gain monitor, dither stripper phase monitor, optical power monitor, power supply current monitor, motor bias monitor, automatic gain control monitor, system generated estimate of gyroscope bias monitor, and system generated estimate of gyroscope scale factor monitor.

15. The system of claim 11, wherein the plurality of diagnostic parameters include statistical compilations of raw data taken by a plurality of monitors.

16. The system of claim 11, wherein the server receives the collected data from the plurality of navigation devices continuously.

17. The system of claim 11, wherein the server receives the collected data from the plurality of navigation devices at specified intervals.

* * * * *